United States Patent [19]

Doninger et al.

[11] 4,379,691
[45] Apr. 12, 1983

[54] OLIVINE BEDDING MATERIAL FOR SOAKING PITS

[75] Inventors: Joseph E. Doninger, Lake Forest, Ill.; George D. Hanson, Audubon, Pa.

[73] Assignee: International Minerals & Chemical Corp., Terre Haute, Ind.

[21] Appl. No.: 310,960

[22] Filed: Oct. 13, 1981

[51] Int. Cl.$^3$ ............................ F27D 1/16; C21B 7/04
[52] U.S. Cl. ........................................... 432/3; 264/30; 266/281; 266/284
[58] Field of Search .............. 432/3; 264/30; 266/280, 266/281, 284, 286

[56] References Cited

U.S. PATENT DOCUMENTS 1,854,899  4/1932  Goldschmidt ..................... 266/281
2,033,886  3/1936  Farnsworth ........................ 266/281

OTHER PUBLICATIONS

Bamba et al., Olivine-Serpentine Resources in Hokkaido and Their Use, Gypsum & Lime 163:33ff, 1979.

Primary Examiner—John J. Camby
Attorney, Agent, or Firm—H. J. Barnett; Robert H. Dewey

[57] ABSTRACT

A method of operating "wet bottom" practice soaking pits to prolong useful period between bed replacement. Olivine is used to replace coke breeze in the bottom of the soaking pit to protect its refractory lining.

Operating periods from 40–60 days are possible when olivine is used in the soaking pit. The olivine has excellent temperature stability, also, so it is well suited for this application, in which temperatures range from about 2400°–2650° F.

9 Claims, No Drawings

OLIVINE BEDDING MATERIAL FOR SOAKING PITS

BACKGROUND

The modern soaking pit has been developed to provide uniform heating of ingots to the desired temperature with a minimum of over-heating of the surface. In most modern designs, this is accomplished with automatic controls. The normal range for heating ingots is about 2400°–2500° F. The proper temperature level varies with grades of steel and sizes of ingots and characteristics of the rolling mill. Low-speed mills with many passes require the higher level of heating for certain grades of steel. Soaking pits serve the dual function of heating and acting as a reservoir to correct irregularities in the flow of ingots between the steel melting shop and the primary rolling mills. Briefly, soaking pits are deep chambers, or furnaces, of square, rectangular or circular shape, into which ingots are placed in an upright position through an opening at the top. A removable cover closes the pit opening. A series of pits, installed usually in rows are placed under cover of a building adjacent to the entering side of the blooming or slabbing mill to be served. The top of the pit is usually several feet above ground level. The pits are spanned by one or more electrically operated traveling cranes equipped with a traveling hoist for charging the ingots into the pits for lifting them out as they are needed by the mill.

The soaking pits are usually lined with a refractory material, such as alumina bench brick. The bottom, or floor, of the soaking pit is subjected to the greatest wear due to the weight of ingots, scale buildup, and localized heating from the ingots being treated, as well as puddling from molten metal. General practice has been to protect the soaking pit bottom with a granular material which soaks up slag, molten scale and molten metal and prevents these materials from directly contacting the refractory lining of the pit bottom. In "wet bottom" practice coke-breeze, a by-product from the coke ovens of the steel mill, has been typically used as a bedding material, or "bottom-making" material.

Where coke breeze is used as a bottom-making material, pit bottoms are made up with coke breeze to a depth of approximately 12 inches to 16 inches. Ashes from burned breeze, or breeze contaminated with scale, refractory or other material, are removed through cinder holes, of which there are usually two, located in the bottom of the pit. Bottoms for the older pit designs generally are made up each day; in modern pits they are made up only every 5–7 days under normal conditions. A recent trend is to utilize what is known as a dry-bottom practice, in which dolomite or magnesite is used as a 2-inch to 4-inch thick covering on the pit hearth.

In "dry bottom" practice, loose refractory crushed brick, magnesite or dolomite is typically used as the bedding material. Such materials are considerably more expensive than coke breeze, but the operation of the "dry bottom" soaking pit may continue for up to five months. When these "dry bed" soaking pits have their bedding material changed, the unit is closed down, and completely cooled, the total downtime being about a week. There is a growing need to replace magnesite and dolomite used in soaking pits because the materials are increasing in cost due to shortages. The amount of bedding material required in a typical soaking pit is about 10–20 tons, determined by the operating area to be covered and the depth of the bedding material.

This invention is directed to the use of heat resistant olivine as a replacement for coke breeze and other bedding materials in soaking pits for steel ingots, and particularly, for "wet-bottom" soaking pits. There are many advantages obtained by replacing coke breeze with olivine. The most important of these is the substantially improved bed life. Typical bed life in "wet bottom practice" using coke breeze as the bedding material is 3–7 days. Olivine used in the same soaking pit has typically provided a bed life of about forty days, and in some cases up to fifty-nine days. Another important advantage of using olivine is that it can be reused after removal from the soaking pit. The recovered olivine can be used in a blast furnace as a stabilizer additive as described in U.S. Pat. No. 4,066,443 issued to James W. Currier on Jan. 3, 1978, and commonly assigned herewith.

PRIOR ART

A Japanese olivine material has apparently been used as a "furnace floor material" in open hearth furnaces, electric furnaces and soaking pits in Japan. It is not known whether this Japanese olivine material had any advantages over other materials, and it is not known whether it was used in combination with other materials. See: Bamba, et al., Olivine-Serpentine Resources in Hokkaido and Their Use, Gypsum & Lime 163:33ff, 1979.

Japanese olivine referred to in the Bamba et al article is obtained from large deposits on the island of Hokkaido. The analysis (expressed as oxides) of this olivine was reported to be: $SiO_2$ 39.8–40.5%; MgO 46.1–47.5% FeO 12.5–13.5%. The heat stability of this olivine is limited because of the limited stability of this material at temperatures of about 1400° F., so this olivine is not considered useful as a refractory material. Olivine obtained from U.S. deposits, however, has significantly less iron oxide content, and is considerably more heat stable.

Olivine obtained from U.S. deposits has a relatively high fusion point (2600°–3200° F.). It has a high heat capacity, good compressive strength and low thermal expansion. All of these properties make it highly suitable for use as a bedding material in soaking pits.

Japanese Pat. No. 78/123,318 dated Oct. 27, 1978, describes the use of iron ore of 5–6 mm diameter as a soaking pit bed material at a thickness of 300–450 mm. It was reported that bed life was about one month. See: CA 90: 108012c (1979).

SUMMARY

In summary, an olivine containing less than about 11% iron oxide, measured as FeO, and, preferably, less than about 10%, and having a heat fusion temperature of about 2600°–3200° F. has been found to be useful as a bedding material in soaking pits for steel ingots to provide protection for the refractory liner in the bottom of the soaking pit, and to greatly extend pit life. Olivine materials suitable for this purpose have the following typical analysis (expressed as oxides): MgO 40–49% by wt.; $SiO_2$ 39–45% by wt.; FeO 6.0–10% by wt.; $Al_2O_3$ 0.1–5% by wt.; $Cr_2O_3$ 0.3–0.9% by wt.; $K_2O$ and $Na_2O$ trace; loss on ignition <6%; real density 3.2–3.5 g/cc. The preferred particle size is from less than about 1 inch, up to about ⅜ inch (U.S. Standard screen scale), and the useful particle size includes a range from less than about 2 inches to more than about ¼ inch (U.S. Standard screen scale). The olivine aggregate is tough and durable and mechanically strong compared to limestone or dolomite. Soaking pit beds which comprise olivine are more stable in supporting the ingots so that they remain more vertical, and are easier to remove. In the typical "wet-bottom" practice, olivine replaces coke breeze, and provides the following advantages:

(a) olivine particles neither fuse nor breakdown, and olivine is a clean mineral, containing less than about 2% free silica;

(b) the dense olivine particles resist penetration of slag (molten scale) or molten metal;

(c) the olivine bedding material remains effective as a protective material for the expensive refractory bottom liner of the soaking pit for a much longer time than coke breeze;

(d) by increasing pit life by about 5–14 times over coke breeze, the use of olivine reduces soaking pit cleanout frequency;

(e) time and labor for maintenance and cleanout reduced;

(f) gas consumption associated with reheating the soaking pit after cleanout is reduced;

(g) the bed is stable under load, allowing vertical ingot placement and more efficient heating;

(h) the recovered olivine may be used in the blast furnace to stabilize the furnace operation.

DETAILED DESCRIPTION

Example

Coarse olivine, having a particle size in the range of 1¼" to ⅜" was spread in the bottom of a soaking pit which has the following bottom dimensions: width 10 ft; length 20 ft; and depth 15 ft. About 11 tons of olivine was used to form an even, protective layer over the soaking pit bottom of about 6–14 inches deep.

The olivine should have the following chemical analysis (expressed as oxides): MgO 40–49% by wt.; $SiO_2$ 39–45% by wt.; FeO 6–10% by wt.; $Al_2O_3$ 0.1–0.5% by wt.; $Cr_2O_3$ 0.3–0.9% by wt.; $K_2O$ and $Na_2O$ trace; fusion point 2800°–3200° F.; loss on ignition <6%; real density 3.2–3.5 g/cc; and was obtained from olivine deposits near Addie, N.C.

Other olivines obtained from various deposits in North Carolina and the state of Washington, which are also useful in the practice of this invention have the following analysis range (expressed as oxides): MgO 38–50% by wt.; $SiO_2$ 38–50% by wt.; FeO 4–11% by wt. (expressed as FeO); $Al_2O_3$ 0.1–0.5% by wt.; $Cr_2O_3$ 0.3–0.9% by wt.; $K_2O$ and $Na_2O$ trace; fusion point 2600°–3200° F. The other physical properties are comparable to the Addie, N.C., sample reported above.

Before filling or "making up" the soaking pit bed, the soaking pit is unloaded and cooled to about 1000° F. The previously used bedding material is removed, and then the above olivine material is loaded in the bed and spread to a uniform level thickness therein. In a typical method of operation, the soaking pit is then refired, and quickly heated to a temperature of about 1600° F., and heating is then continued in increments until the operating temperature of about 2450° F. is reached. Coke oven gas, blast furnace gas, or combinations of both, can be used as the fuel.

The soaking pit is then operated in the usual manner to heat cold ingots to rolling temperature; equalize temperatures in those ingots not totally solidified; and to serve as a storage area for hot ingots until they can be rolled. Residence time in the soaking pit can vary considerably, depending on temperature and production requirements.

The above olivine material, used as described, has given a very prolonged "wet bottom" soaking pit life up to fifty-nine days in at least one case, and on the average about 25–40 days when the bed was stirred regularly between ingot loads. This prolonged life is greatly improved over the typical bed life of 3–7 days when coke breeze is used as the bedding material in a "wet bottom" practice soaking pit. Average bed life using the above olivine material may vary depending on specific conditions, but in all cases, it has been typically more than three times as long as coke breeze bedding materials, when used under the same conditions.

The prolonged bed life obtained using the above olivine material represents a substantial savings in labor, energy and production time. When the cost of olivine is balanced against these operational economics, its use in "wet bottom practice" soaking pits represents a substantial improvement over the prior practice.

In addition to the above advantages, when the ingots are removed from the soaking pit bed, after "soaking", the olivine separates readily from the bottom of the ingots. This is important, because any material which adheres to the end of an ingot can end up in the rolled product. Furthermore, hard refractory lumps would be undesirable in contact with the rolls.

We claim:

1. In an improved method of operating a "wet bottom" practice soaking pit having a horizontal bottom, sidewalls and top defining a heating chamber used to heat treat metal ingots in a continuous batch sequence without cooling said soaking pit between batches, the improvement comprising filling the bottom of said soaking pit to a level of about 6–14 inches with a particulate olivine material having a heat fusion point of at least about 2600° F., said olivine material being capable of extending the operational life ot said soaking pit to at least twenty days continuous operation without replacing said olivine material.

2. The method of claim 1, in which said olivine material is stirred and releveled between loadings with ingots to be treated.

3. The method of claim 1, in which the olivine material has the following analysis: MgO 38–50% by wt.; $SiO_2$ 38–50% by wt.; FeO 4–11% by wt. (expressed as FeO); $Al_2O_3$ 0.1–0.5% by wt.; $Cr_2O_3$ 0.3–0.9% by wt.; $K_2O$ and $Na_2O$, trace; fusion point 2600°–3200° F.; loss on ignition <6%; real density 3.2–3.5 g/cc.

4. The method of claim 1, in which the olivine material has the following analysis (expressed as oxides): MgO 40–49% by wt.; $SiO_2$ 39–45% by wt.; FeO 6–10% by wt.; $Al_2O_3$ 0.1–0.5% by wt.; $Cr_2O_3$ 0.3–0.9% by wt.; $K_2O$ and $Na_2O$, trace; loss on ignition <6%; real density 3.2–3.5 g/cc.

5. The method of claim 4, in which the average particle size of the olivine material is less than about two inches.

6. In an improved method of operating a metal ingot soaking pit having a horizontal bottom, sidewalls and top defining a heating chamber, the improvement comprising covering the bottom of said soaking pit with a layer of a particulate olivine material having an iron oxide content less than about 11% measured as FeO, and having a heat fusion point of at least about 2600° F., said olivine material providing improved handling, uniform thermal insulation and a substantially horizontal uniform supporting bed for metal ingots being carried in said soaking pit, whereby the ingots retain substantially vertical positions during treatment.

7. The method of claim 6, in which the soaking pit is a "dry bottom" practice soaking pit, and the olivine material has a particle size in the range of about ¼ inch to 1 inch in diameter, and said olivine material is disposed in a layer from 2-4 inches in thickness over the bottom of the soaking pit.

8. The method of claim 7, in which the olivine material has the following analysis: MgO 38–50% by wt.; $SiO_2$ 38–50% by wt.; FeO 4–11% by wt. (expressed as FeO); $Al_2O_3$ 0.1–0.5% by wt.; $Cr_2O_3$ 0.3–0.9% by wt.; $K_2O$ and $Na_2O$, trace; fusion point 2600°–3200° F.; loss on ignition <6%; real density 3.2–3.5 g/cc.

9. The method of claim 7, in which the olivine material has the following analysis: MgO 40–49% by wt.; $SiO_2$ 39–45% by wt.; FeO 6–10% by wt.; $Al_2O_3$ 0.1–0.5% by wt.; $Cr_2O_3$ 0.3–0.9% by wt.; $K_2O$ and $Na_2O$, trace; loss on ignition <6%; real density 3.2–3.5 g/cc.

* * * * *

UNITED STATES PATENT AND TRADEMARK OFFICE
CERTIFICATE OF CORRECTION

PATENT NO. : 4,379,691
DATED : April 12, 1983
INVENTOR(S) : J. E. Doninger and G. D. Hanson It is certified that error appears in the above-identified patent and that said Letters Patent are hereby corrected as shown below:

Column 2, line 61 - "materials" should read -- minerals --

Column 5, Claim 6, line 2, "carried" should read -- treated --

Column 5, Claim 7, line 2, "$\overline{+}$dry bottom" should read
-- "dry bottom" --

Signed and Sealed this

Twenty-ninth Day of November 1983

[SEAL]

Attest:

GERALD J. MOSSINGHOFF

Attesting Officer      Commissioner of Patents and Trademarks